United States Patent [19]

Camp

[11] 3,730,318

[45] May 1, 1973

[54] DEVICE FOR CONNECTING A CABLE TO A LEVER

[75] Inventor: John W. A. Camp, Colchester, England

[73] Assignee: Ford Motor Company, Dearborn, Mich.

[22] Filed: Mar. 29, 1971

[21] Appl. No.: 128,790

[30] Foreign Application Priority Data

Ap. 11, 1970 Great Britain......................17,332/70

[52] U.S. Cl..................192/99 S, 74/501 R, 74/512, 287/92
[51] Int. Cl.............................................F16d 19/00
[58] Field of Search....................74/512, 501 R, 103, 74/108; 287/92; 192/99 S

[56] References Cited

UNITED STATES PATENTS

| 1,589,918 | 6/1926 | Worthington | 74/108 |
| 3,253,480 | 5/1966 | Fernberg | 74/501 |
| 3,254,748 | 6/1966 | Smirl | 192/99 S |

*Primary Examiner*—Milton Kaufman
*Attorney*—John R. Faulkner and Clifford L. Sadler

[57] ABSTRACT

A device for connecting a cable to a lever comprising a retaining member having an arcuate bearing surface and a cable having a flat head connected to its end. The flat head on the end of the cable is rockable on the arcuate retaining member surface whereby the cable end pivots with respect to the lever as the lever is pivoted.

9 Claims, 4 Drawing Figures

DEVICE FOR CONNECTING A CABLE TO A LEVER

BACKGROUND OF THE DISCLOSURE

This invention relates to lever and cable assemblies of the kind in which one end of a cable is connected to a lever and the lever is pivotable to actuate a mechanism connected to the other end of the cable. A clutch pedal and clutch control cable is an example of an assembly of this kind.

In such assemblies, a rigid connection between the cable and lever produces excessive localized bending of the cable at its connection with the cable end fitting as the lever pivots thereby causing the cable to break at this point. Such wear can be reduced by providing a pivotal connection between the cable fitting and the lever. However, conventional forms of a simple pivotal connection produce excessive friction resulting in reduced efficiency.

BRIEF SUMMARY OF THE DISCLOSURE

In accordance with the presently preferred embodiment of this invention, a lever and cable assembly has the following features. A cable is connected to a pivotally mounted lever by engagement of a fitting fixed to the end of the cable with a retaining member mounted on the lever. A flat head portion of the cable fitting rolls on a curved bearing surface on the retaining member to allow pivotal movement of the end of the cable relative to the lever. A locating projection or element of the cable end fitting has a clearance fit in a recess of the retaining member. The locating projection is engageable with the recess as the cable fitting pivots relative to the lever to reposition the flat head relative to the retaining surface upon which it rocks.

In one embodiment, the locating projection or element of the fitting is semi-cylindrical with a radius that is greater than the radius of the curved surface of the retaining member. The axis of the semi-cylindrical portion substantially coincides with the line of contact between the flat head of the fitting and the bearing surface of the retaining member.

BRIEF DESCRIPTION OF THE DRAWINGS

The invention will be described with reference to the accompanying drawings, in which:

FIG. 4 is an elevational view partly in section taken along the section line 4—4 of FIG. 2 with the cable end fitting in the position corresponding to engagement of the clutch.

DETAILED DESCRIPTION OF THE PREFERRED EMBODIMENT

Figure 1:
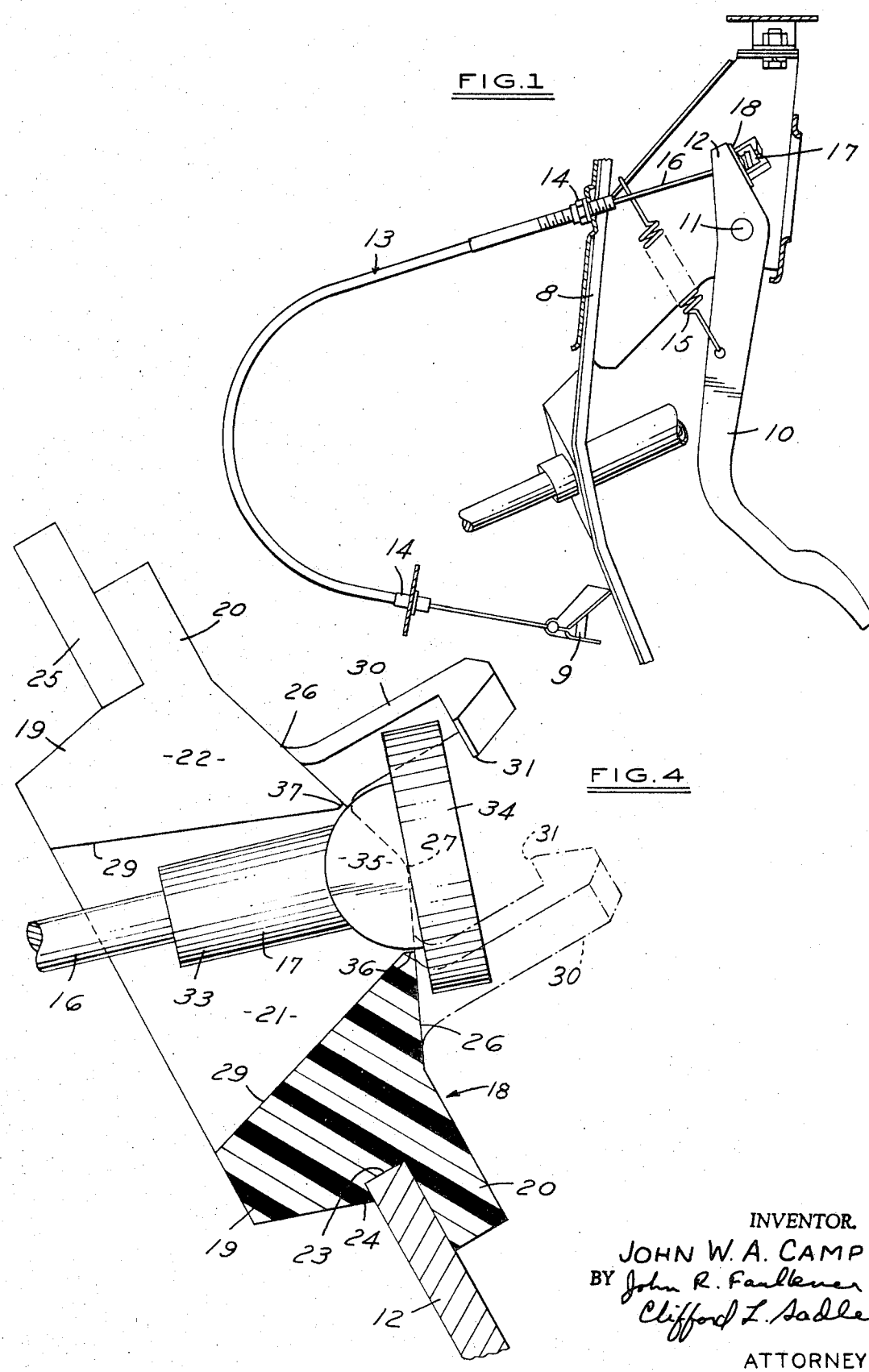
FIG. 1 is a side elevation view of a motor vehicle clutch release mechanism embodying the present invention.

Referring now to the drawings, wherein the presently preferred embodiment of this invention is illustrated, the clutch release mechanism of FIG. 1 includes a clutch pedal lever 10 pivotally mounted at 11 on the body structure 8 of a motor vehicle. The upper end of the pedal 10 is connected to the release lever 9 of a diaphragm clutch (not shown) by a Bowden type cable assembly 13. Both ends 14 of the cable guide or conduit are fixed to the vehicle body structure 8.

A flexible push-pull cable 16 is slidably disposed within the cable guide. The cable 16 is operably interposed between the pedal lever 10 and the clutch release lever 9. A spring 15 is interposed between the pedal 10 and the body structure 8 and insures that cable 16 is maintained in tension at all times.

As the pedal 10 is depressed to release the clutch, means are provided to cause the end of the cable 16 to pivot relative to the portion of the pedal 10 to which it is connected. A fitting 17 connected to the end of the cable 16 and a retaining member 18 mounted on the end of the clutch pedal 10 are arranged to allow such pivotal movement with a minimum of friction and thereby reduce bending of the cable 16.

Figure 2:
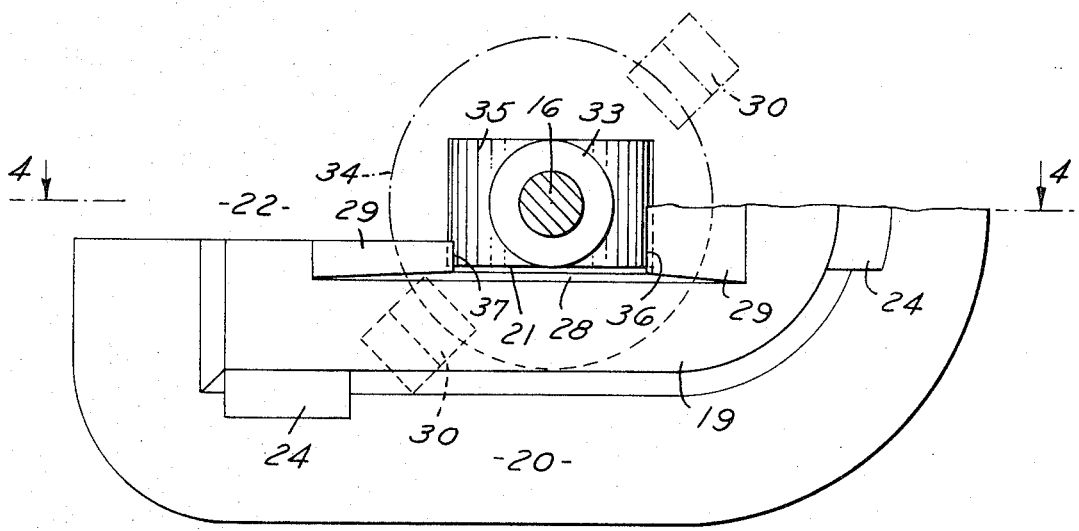
FIG. 2 is a bottom plan view of the cable end fitting and the retaining member of the mechanism of FIG. 1 with the cable fitting in an intermediate position relative to the retaining member.
Figure 3:
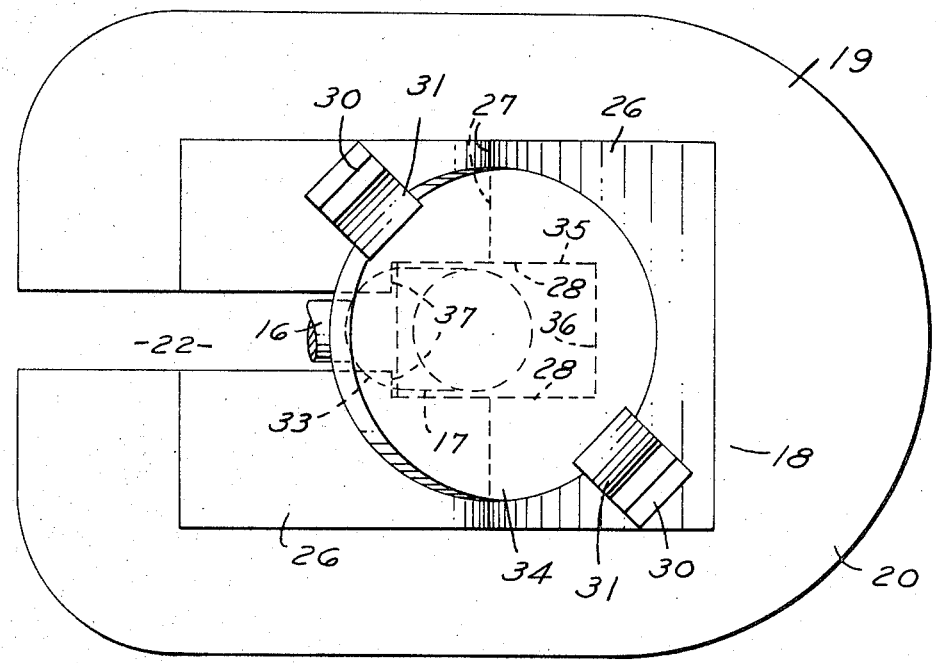
FIG. 3 is a top plan view of the cable end fitting and retaining member of FIG. 2.

The retaining member 18 is formed of plastic material, for example nylon, and includes a body 19 having a flange portion 20. In the body 19, an aperture 21 communicates with a slot 22. The width of the slot 22 is just sufficient to permit insertion of the cable 16 therethrough. The body 19 has a close fit in an aperture 23 formed in the end of the pedal 10 and is retained in the aperture 23 with the flange 20 in contact with the surface of the pedal 10 by the locking tabs 24 (FIGS. 2 and 4). Slot 22 closes slightly and then reopens as the retaining member 18 snaps into the aperture 23 in the pedal 10. A slot 25 in the pedal 10 registers with the slot 22 in the retaining member 18.

The upper surface of the body 19 is formed with inclined surfaces 26 having at their apex a smoothly curved, part cylindrical, surface 27 extending across the retaining member 18 parallel to the axis of the pivot support 11 of the pedal 10. The aperture 21 in retaining member 18 has a rectangular cross section and is located symmetrically with respect to the curved surface 27. The end walls 29 of the aperture 21 diverge to provide clearance for the cable.

A pair of pillars 30, equi-spaced from the center of the aperture 21, extend upwardly from the body 19. Each pillar 30 is formed with an inwardly directed retaining projection 31.

The cable fitting 17 comprises a sleeve 33 crimped to the end of the flexible cable 16, a semi-cylindrical locating projection or element 35 that is connected to the end of the sleeve 33 and a flat disc-shaped head 34 positioned adjacent the locating element 35. The diameter of the head 34 is greater than the width of the aperture 21 but somewhat less than the distance between the pillars 30. The locating projection 35 has a clearance fit within the aperture 21 and has a radius that is approximately twice the radius of the curved surface 27.

OPERATION

The cable fitting 17 is assembled into engagement with the retaining member 18 by passing the cable 16 through the slot 22 into the aperture 21 and then lowering the sleeve 33 of fitting 17 through the aperture 21 until the head 34 engages the pillars 30. The head is then snapped past the retaining projections 31.

The head 34 is maintained in pressure contact with the curved bearing surface 27 of the retaining member 18 by the spring 15 interposed between the pedal 10 and the body 8. The forces applied to the cable 16 by the pressure of the pedal 10 for release of the clutch are transmitted through the line of contact between the curved surface 27 and the head 34.

As the pedal 10 pivots during clutch release and engagement, the head 34 rocks on the curved surface 27 without slipping relative to it. The surface 27 constitutes a fulcrum for the rocking movement of the head 34.

When the head 34 is correctly positioned relative to the retaining member 18, there is no other contact between the cable fitting 17 and the retaining member 18 except possibly for light rubbing contact of one of the ends of the locating projection 35 with one of the side walls 28 of the aperture 21. It will be appreciated, therefore, that the cable 16 is able to pivot relative to the pedal 10 with very little friction.

The head 34 of fitting 17 is normally prevented from slipping relative to the retainer 18 by friction at the point of contact. However, slipping may occur from time to time. Accordingly, the locating projection 35 is shaped to restore the head 34 to its correct position and to initially position the head 34 after assembly of the mechanism. When the head 34 is correctly positioned, there is clearance between the semi-cylindrical surface of the locating projection 35 and the ends 36 and 37 of the aperture 21.

As the cable end fitting 17 pivots relative to the pedal 10 from the extreme position shown in FIG. 4 to the other extreme position, the clearance at the end 36 increases and the clearance at the end 37 decreases. Thus, if the head slips to bring the locating projection 35 into contact with the end 37 then the next time the pedal 10 is actuated, the head 34 will be pushed back along the curved surface 27 as the cable end fitting 17 pivots relative to the pedal.

The locating projection 35 is thus effective to restore the head 34 to a position such that contact of the locating projection 35 with one of the edges 36 or 37 of the retaining member 18 takes place along the extreme positions of the cable end fitting 17 relative to the pedal.

In an alternate construction, the surface 27 may be angular rather than curved to form a fulcrum for the rocking movement of head 34.

The foregoing description presents the presently preferred embodiment of this invention. Modifications and alterations may occur to those skilled in the art that will come within the scope and spirit of the following claims.

I claim:

1. An actuating mechanism comprising a lever, a cable and means interconnecting said lever and said cable, said means comprising an end fitting rigidly secured to the end of said cable and having a first surface, said lever having a second surface engaging said first surface, one of said surfaces being constructed as a fulcrum for the rockable support of said end fitting relative to said lever whereby said end fitting will be free to rock relative to said lever upon pivotal movement of said lever, said first and second surfaces being in engagement along a line generally parallel to the pivot axis of said lever.

2. An actuating mechanism comprising a lever, a cable and means interconnecting said cable and said lever, said means comprising a cable end fitting secured to said cable and having a flat surface extending generally perpendicular to the axis of the end of said cable, said lever having a fulcrum surface engaging said flat surface, said flat surface being rockable on said fulcrum surface when said lever is pivotally displaced.

3. An actuating mechanism comprising a lever, a cable and means interconnecting said cable and said lever, said means comprising a cable end fitting rigidly secured to the end of said cable and having first and second portions, a member secured to said lever and having first and second portions, one of said first portions having a fulcrum engaging the other of said first portions, said first portions being constructed to permit said end fitting to rock relative to said member when said lever is pivotally displaced, said second portions being constructed to position said first portions in cooperative relationship.

4. An actuating mechanism according to Claim 3 and including:
   said member having means constructed to prevent the accidental dislodgement of said end fitting.

5. An actuating mechanism according to claim 3 and including:
   said first portions being in line contact along a straight line extending parallel to the pivot axis of said lever.

6. An actuating mechanism comprising a lever, a cable and means interconnecting said cable and said lever, said means comprising a cable end fitting having a first portion secured to said cable, said cable end fitting having a second portion with a flat surface extending generally perpendicular to the axis of the end of said cable, a retaining means secured to said lever, said retaining means having a recess receiving said first portion and a fulcrum surface engaging said flat surface, said retaining means being constructed to prevent the accidental dislodgement of said end fitting, said flat surface being rockable on said fulcrum surface when said lever is pivotally displaced, said recess and said first portion being constructed to cooperatively position said flat surface centrally of said fulcrum surface.

7. An actuating mechanism according to claim 6 and including:
   said flat surface and said fulcrum surface being in line contact along a straight line extending parallel to the pivot axis of said lever.

8. A clutch release mechanism comprising a pedal, a clutch release lever, a cable connected to said lever, means interconnecting said cable and said pedal, said means comprising a cable end fitting have a first portion and a second portion with a flat surface extending generally perpendicular to the axis of the end of said cable, a retaining means secured to said pedal, said retaining means having a recess receiving said first portion and a fulcrum surface engaging said flat surface, said retaining means having means constructed to prevent the accidental dislodgement of said end fitting, said flat surface being rockable on said fulcrum surface when said pedal is pivotally displaced, said recess and said first portion being constructed to cooperatively position said flat surface centrally of said fulcrum surface.

9. An actuating mechanism comprising a lever, a cable and means interconnecting said cable and said lever, said means comprising a cable end fitting member rigidly secured to the end of said cable, a retaining member secured to said lever, one of said members having a fulcrum portion and the other of said members having a fulcrum receiving portion engaging said fulcrum portion, said portions being constructed to permit said fitting member to rock relative to said retaining member in a substantially frictionless manner when said lever is pivotally displaced, said members having engageable portions constructed to retain said fitting member in cooperative relationship with respect to said retaining member.

* * * * *